(12) United States Patent
Nakano (10) Patent No.: US 7,032,128 B2
(45) Date of Patent: Apr. 18, 2006

(54) METHOD FOR MANAGING COMPUTER, APPARATUS FOR MANAGING COMPUTER, AND COMPUTER READABLE MEDIUM STORING PROGRAM FOR MANAGING COMPUTER

(75) Inventor: Takayuki Nakano, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 176 days.

(21) Appl. No.: 10/745,622

(22) Filed: Dec. 29, 2003

(65) Prior Publication Data

US 2004/0205388 A1 Oct. 14, 2004

(30) Foreign Application Priority Data

Mar. 28, 2003 (JP) ............................... 2003-092248

(51) Int. Cl.
*G06F 11/00* (2006.01)
(52) U.S. Cl. ..................... 714/11; 714/12; 714/13; 711/147
(58) Field of Classification Search ................. 714/11, 714/12, 13, 4; 711/154, 147
See application file for complete search history.

(56) References Cited

U.S. PATENT DOCUMENTS

| | | | |
|---|---|---|---|
| 5,544,077 A | 8/1996 | Hershey | |
| 5,696,895 A | 12/1997 | Hemphill et al. | |
| 5,812,751 A * | 9/1998 | Ekrot et al. ..................... | 714/4 |
| 5,930,823 A | 7/1999 | Ito et al. | |
| 6,138,248 A | 10/2000 | Saito et al. | |
| 6,219,801 B1 * | 4/2001 | Yuge et al. ..................... | 714/13 |
| 6,438,705 B1 * | 8/2002 | Chao et al. ..................... | 714/4 |
| 6,532,494 B1 * | 3/2003 | Frank et al. ................. | 709/224 |
| 6,594,786 B1 * | 7/2003 | Connelly et al. ............. | 714/50 |
| 6,625,750 B1 | 9/2003 | Duso et al. | |
| 6,662,219 B1 * | 12/2003 | Nishanov et al. ........... | 709/220 |
| 6,715,098 B1 * | 3/2004 | Chen et al. ..................... | 714/3 |
| 6,728,896 B1 | 4/2004 | Forbes et al. | |
| 6,748,550 B1 | 6/2004 | McBrearty et al. | |
| 6,804,703 B1 * | 10/2004 | Allen et al. ................. | 709/216 |
| 2003/0093712 A1 | 5/2003 | Cepulis | |
| 2003/0140270 A1 * | 7/2003 | Lehmann ....................... | 714/6 |
| 2004/0139365 A1 | 7/2004 | Hosoya | |

FOREIGN PATENT DOCUMENTS

JP A-2001-014256 1/2001

\* cited by examiner

*Primary Examiner*—Robert Beusoliel
*Assistant Examiner*—Yolanda Wilson
(74) *Attorney, Agent, or Firm*—Mattingly, Stanger, Malur & Brundidge, P.C.

(57) ABSTRACT

A computer managing system includes an active system computer having a heart beat transmission processing unit for transmitting a heart beat signal indicating that an active system computer is being operated in normal to a spare system computer, and transmitting the heart beat signal to a first control unit; a spare system computer including a monitor request processing unit for transmitting a monitoring request of the active system computer to the first control unit in accordance with a determination result of whether or not a fault has occurred in the active system computer; and the first control unit including a heart beat transmit instruction processing unit for instructing a transmission of the heart beat signal to the first control unit, to the active system computer, when receiving the monitoring request from the spare system computer.

10 Claims, 11 Drawing Sheets

METHOD FOR MANAGING COMPUTER, APPARATUS FOR MANAGING COMPUTER, AND COMPUTER READABLE MEDIUM STORING PROGRAM FOR MANAGING COMPUTER

BACKGROUND OF THE INVENTION

1. Field of the Invention

The present invention relates to a computer managing method, an executing system thereof, and a recording medium for storing a managing program.

2. Description of the Related Art

The conventional computer managing system provides a HA (high availability) system in which an active system computer and a spare system computer are connected to a common disk drive to make a redundant system for an improved utility of the computer system as a whole (U.S. Pat. No. 6,138,248).

In this system, a heart beat signal is transmitted from the active system computer normally executing a business program to a spare system computer. Upon occurrence of a fault in the active system computer and cessation of transmission of the heart beat signal from the active system computer to the spare system computer, the spare system computer detects the fault of the active system computer from the cessation of the heart beat signal and gives an instruction to switch from the spare system to the active system.

The active system computer, in compliance with the switching instruction, releases the right to access the common disk and gives an instruction to the spare system to complete the system switching operation. The spare system computer, upon receipt of the instruction, acquires the right to access the common disk, and takes over the processing of the business program as a new active system.

SUMMARY OF THE INVENTION

In the case where the conventional HA system having a common disk drive is switched to the spare system due to a fault of the active system, the right to control the common disk thus far held by the active system is required to be transferred. Generally, this function is executed by a cluster control program. In the case of an abnormal halt of the OS or a hang-up of the whole computer system, however, the cluster control program is also halted. Therefore, the transfer of the right to control the common disk is not necessarily guaranteed by the cluster control program. As a method of avoiding this inconvenience independently of the OS or the cluster control program, the active system is forcibly rebooted from the spare system using special hardware in case of a fault of the active system. This method, however, is not applicable to general purposes.

In the case where the monitor bus (the communication path of the heart beat signal) used by the cluster control program of each of the active system and the spare system to notify the operating conditions develops a fault, the spare system cannot detect a fault which may develop in the active system, and therefore cannot give an instruction to switch the system.

Accordingly, an object of this invention is to solve the problem described above and provide a technique capable of transferring the right to access the common device even in the case where the system cannot be switched from the active system computer.

Another object of the invention is to provide a technique capable of continuing to monitor the active system computer even in the case where a fault occurs on the monitor bus for transmitting the heart beat signal to the spare system computer from the active system computer.

This invention is intended to transfer the right to access the common device in the case where a fault occurs in the active system computer.

In the computer managing system according to the invention, assuming that the active system computer develops a fault and the transmission of the heart beat signal from the active system to the spare system ceases. The spare system computer detects the fault in the active system from the cessation of the heart beat signal. Thus, the spare system gives an instruction to the active system to switch the operation.

In the case where no response is received from the active system computer to the system switch instruction described above, the spare system computer instructs a common storage control unit to switch from the active system computer to the spare system computer.

The common storage control unit, upon receipt of the switch instruction from the spare system computer, sends an inquiry to the active system computer about whether the active system computer is in normal operation or not.

In the case where the active system computer is found not in normal operation as the result of the inquiry described above, the common storage control unit transfers the right of the active system computer to access the common device.

As described above, in the computer managing system according to the invention, the access right to the common device is released in the case of a fault of the active system computer. Even in the case where the switching from the active system computer is impossible, therefore, the access right to the common device can be transferred.

Other objects, features and advantages of the invention will become apparent from the following description of the embodiments of the invention taken in conjunction with the accompanying drawings.

DETAILED DESCRIPTION OF THE EMBODIMENTS

An explanation is given below about a computer managing system according to a first embodiment of the invention in which the right to access a common disk unit is transferred in the case where the active system computer develops a fault.

First Embodiment

Figure 1:
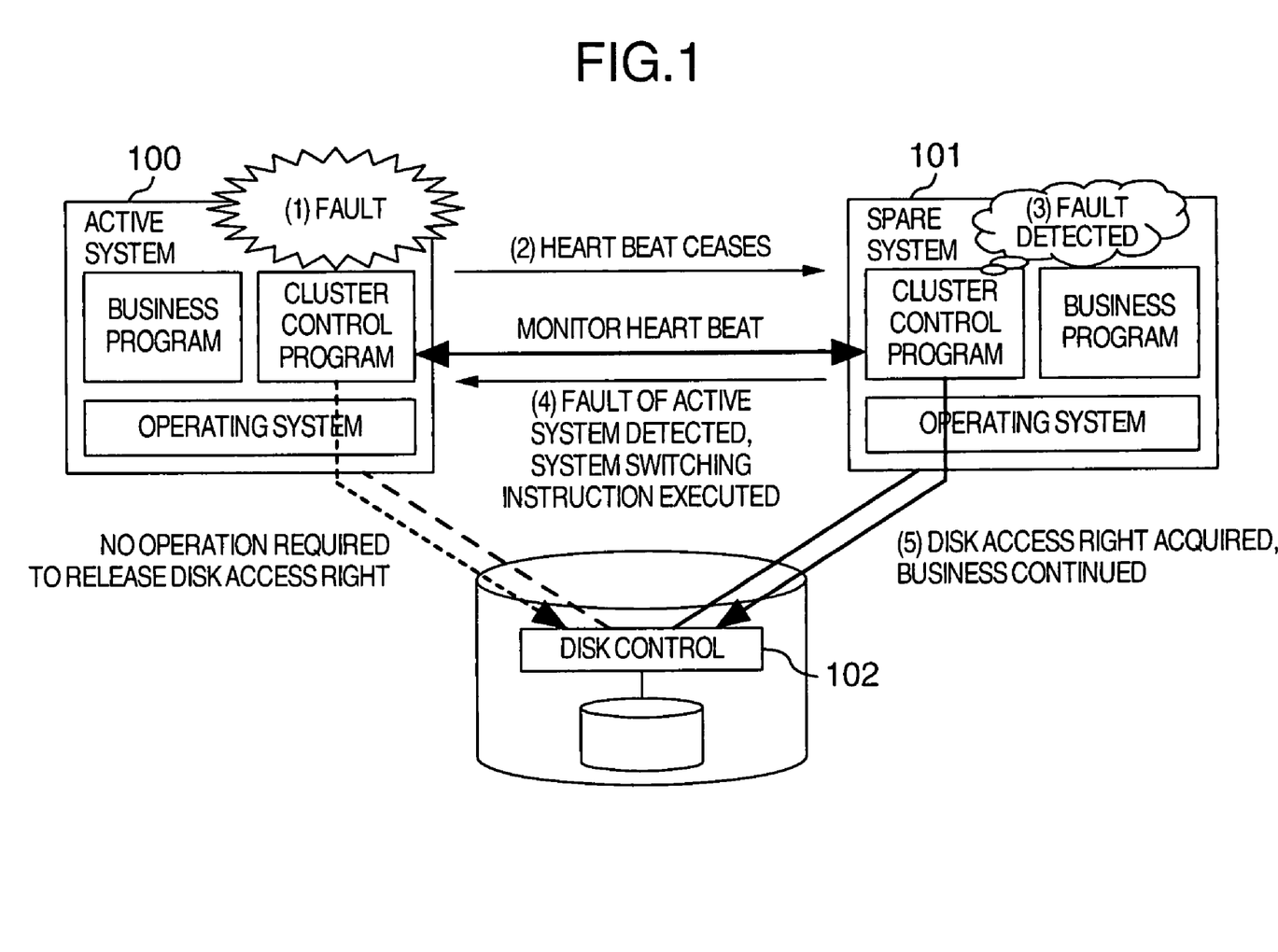
FIG. 1 is a diagram schematically showing the process in a computer managing system according to a first embodiment.

FIG. 1 is a diagram schematically showing the processing in a computer managing system according to a first embodiment. As shown in FIG. 1, the computer managing system according to this embodiment operates as follows: Specifically, assume that a fault occurs in the active system computer 100 (which may be a computer, an information processing system or a program or an object for executing the processing thereof) and that the heart beat ceases to be sent out from the active system to the spare system. In response to the cessation of the heart beat, the spare system computer 101 (which may be a computer, an information processing system or a program or an object for executing the processing) detects the fault and sends an instruction to the active system computer to switch to the spare computer system. In the absence of a response to the system switch instruction sent from the spare system to the active system, a disk control unit (which may be a storage control unit, or a program or an object for executing the processing thereof) is instructed by the spare system to forcibly acquire the right to access a common disk (which may be a common storage unit or a program or an object for executing the processing thereof). The disk control unit thus causes the active system to release the right to access the common disk and transfers the same right to the requesting system. Thus, the spare system computer 101 acquires the right to access the disk, and takes over the business as a new active system.

Figure 2:
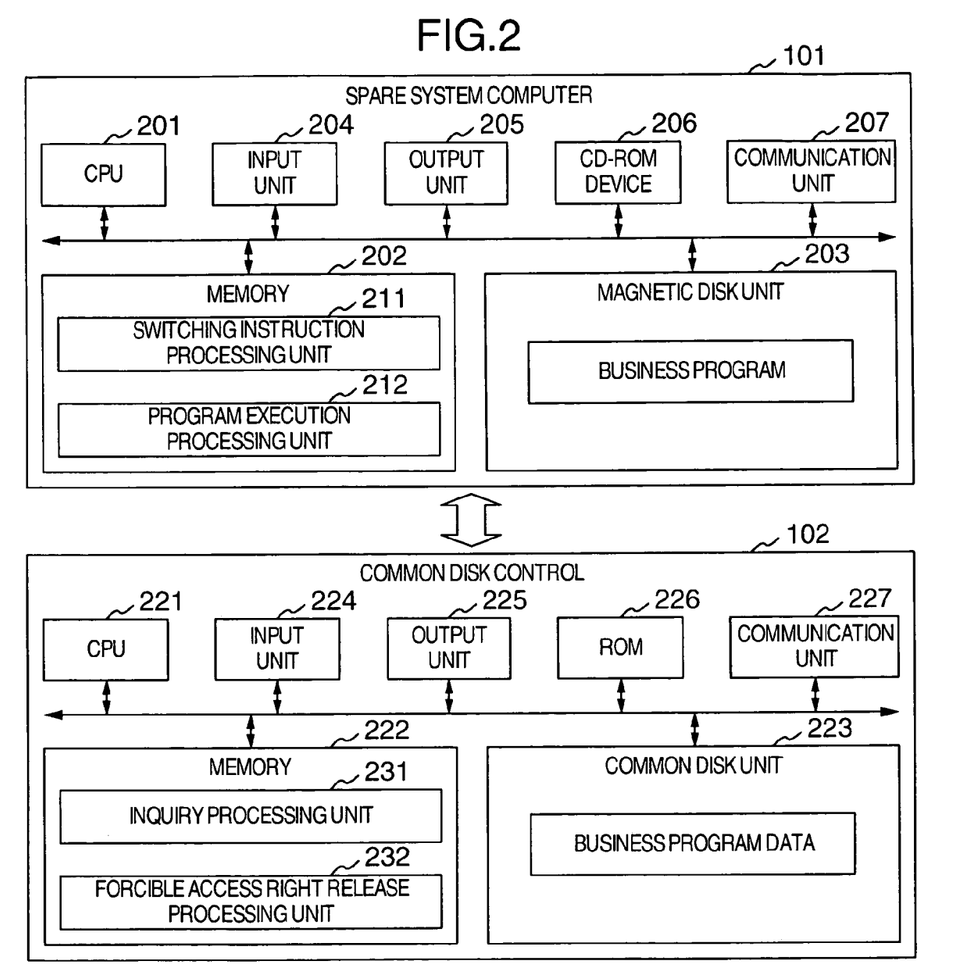
FIG. 2 is a diagram showing a general configuration of a spare system computer 101 and a common disk control unit 102 according to the first embodiment.

FIG. 2 is a diagram showing a general configuration of the spare system computer 101 and the common disk control unit 102 according to this embodiment. As shown in FIG. 2, the spare system computer 101 according to this embodiment comprises a CPU 201, a memory 202, a magnetic disk unit 203, an input unit 204, an output unit 205, a CD-ROM unit 206 and a communication unit 207.

The CPU 201 is a device for controlling the overall operation of the spare system computer 101. The memory 202 is a storage unit for loading various programs and data used to control the overall operation of the spare system computer 101.

The magnetic disk unit 203 is a storage device for storing various programs and data. The input unit 204 is a device for inputting various data to take over the business process in case of a fault of the active system. The output unit 205 is a device for outputting various data for taking over the business process.

The CD-ROM unit 206 is a device for reading the contents of the CD-ROM having recorded therein the various processing programs. The communication unit 207 is a device for carrying out communication with other processing units through a network such an internet or an intranet.

The spare system computer 101 further includes a system switch instruction processing unit 211 and a program execution processing unit 212.

The system switch instruction processing unit 211 is a device for instructing the common disk control unit 102 to switch from the active system computer 100 to the spare system computer 101 upon detection of a fault in the active system computer 100.

The program execution processing unit 212 is a device for taking over the program process (the process for executing an application program, a business program, other programs and objects) thus far executed in the active system computer 100, in the case where the access right is transferred to the spare system computer by the common disk control unit 102.

The program for causing the spare system computer 101 to function as the system switch instruction processing unit 211 and the program execution processing unit 212 is recorded in a recording medium such as a CD-ROM, stored in a magnetic disk or the like, loaded in a memory and executed. The recording medium for recording the program may be other appropriate means than the CD-ROM. The program may be installed from the recording medium into the information processing system, or may be used by accessing the recording medium through a network.

The common disk control unit 102 includes a CPU 221, a memory 222, a common disk unit 223, an input unit 224, an output unit 225, a CD-ROM unit 226 and a communication unit 227.

The CPU 221 is a device for controlling the overall operation of the spare system computer 101. The memory 222 is a storage device for loading various processing programs and data used to control the overall operation of the spare system computer 101.

The common disk unit 223 is a storage device for storing the various processing programs and data. The input unit 224 is a device for inputting various signals and data to switch the-system in case of a fault of the active system. The output unit 225 is a device for outputting various signals and data at the time of switching the system.

The CD-ROM unit 226 is a device for reading the contents of the CD-ROM having recorded therein the various processing programs. The communication unit 227 is a device for conducting communication with other processing units through a network such as an internet or an intranet.

The common disk control unit 102 includes an inquiry processing unit 231 and a forcible release processing unit 232.

The inquiry processing unit 231, upon receipt of a system switch instruction from the spare system computer 101, sends an inquiry to the active system computer 100 about whether the active system computer 100 is normally operating or not.

The forcible release processing unit 232, upon detection that the active system computer 100 is not found to be operating normally as a result of the inquiry, causes the active system computer 100 to release the right to access the common disk and releases the access right to the spare system computer 101. This processing unit releases the access right not based on the preset access right.

The program for causing the common disk control unit 102 to function as the inquiry processing unit 231 and the forcible release processing unit 232 is recorded in a recording medium such as a CD-ROM, stored in a magnetic disk, loaded in a memory and executed. The program may be used by being installed in an information processing system from the recording medium or by accessing the recording medium through a network.

Figure 3:
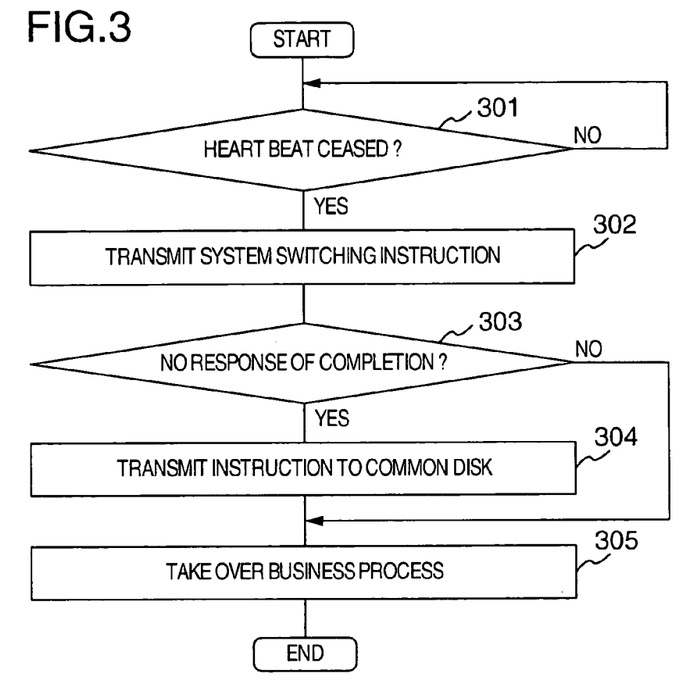
FIG. 3 is a flowchart showing the processing steps of the spare system computer 101 according to the first embodiment.

FIG. 3 is a flowchart showing the processing steps of the spare system computer 101 according to this embodiment. As shown in FIG. 3, in step 301, the system switch instruction processing unit 211 of the spare system computer 101 checks to see whether the heart beat signal is received from the active system computer 100 through the communication unit 207, and upon detection of the cessation of the heart beat signal (the state in which heart beat signal cannot be detected even after the lapse of a predetermined length of time), i.e. a fault of the active system computer 100, the process proceeds to step 302.

In step 302, an instruction to switch from the active system computer 100 to the spare system computer 101 is transmitted to the active system computer 100 through the communication unit 207. Step 303 is to check to see whether a response indicating the completion of the processing in accordance with the system switch instruction has been received or not from the active system computer 100 through the communication unit 207, and in the absence of the response, the process proceeds to step 304.

In step 304, the instruction to switch from the active system computer 100 to the spare system computer 101 is transmitted to the common disk control unit 102 through the communication unit 207.

Figure 4:
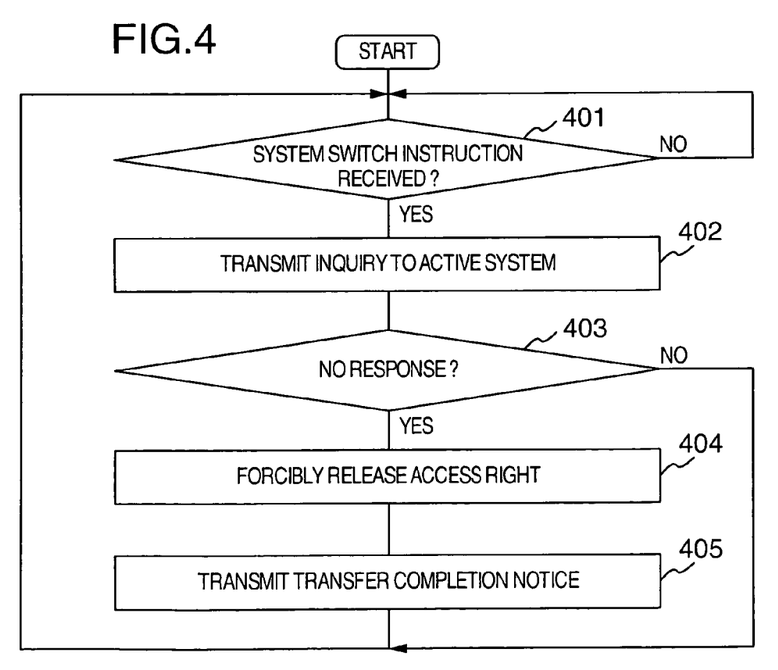
FIG. 4 is a flowchart showing the processing steps of the common disk control unit 102 according to the first embodiment.

FIG. 4 is a flowchart showing the processing steps of the common disk control unit 102 according to this embodiment. As shown in FIG. 4, in step 401, the inquiry processing unit 231 of the common disk control unit 102 checks to see whether the instruction to switch from the active system computer 100 to the spare system computer 101 has been received from the spare system computer 101 through the communication unit 227 (which may alternatively be a program or an object for executing the same processing), and upon receipt of the system switch instruction, the process proceeds to step 402.

In step 402, an inquiry is sent to the active system computer 100 through the communication unit 227 about whether the active system computer 100 is operating normally or not. Step 403 is to check to see whether a response to the inquiry has been received or not from the active system computer 100 through the communication unit 227. In the absence of the response, the active system computer 100 is regarded not in normal operation and the process proceeds to step 404.

In step 404, the forcible release processing unit 232 releases the right of the active system computer 100 to access the common disk and grants the access right to the spare system computer 101 by changing the access control information stored in the common disk control unit 102.

In step 405, the notice to the effect that the right of the active system computer 100 to access the common disk is released and the access right is granted to the spare system computer 101 is transmitted to the spare system computer 101 through the communication unit 227.

In step 305 shown in FIG. 3, the program execution processing unit 212 of the spare system computer 101, upon receipt of the notice from the common disk control unit 102 through the communication unit.207, detects that the access right to the common disk is granted to the spare system computer 101 and takes over the program process that has thus far been executed by the active system computer 100.

As described above, with the computer managing system according to this embodiment, the right to access the common disk is released in case of a fault of the active system computer. Even in the case where the system is not switched from the active system computer, the right to access the common disk can be released.

Second Embodiment

An explanation is given below about a computer managing system according to a second embodiment in which the heart beat signal is transmitted to the common disk control unit from the active system computer in the case where the heart beat signal ceases to be transmitted from the active system computer to the spare system computer.

Figure 5:
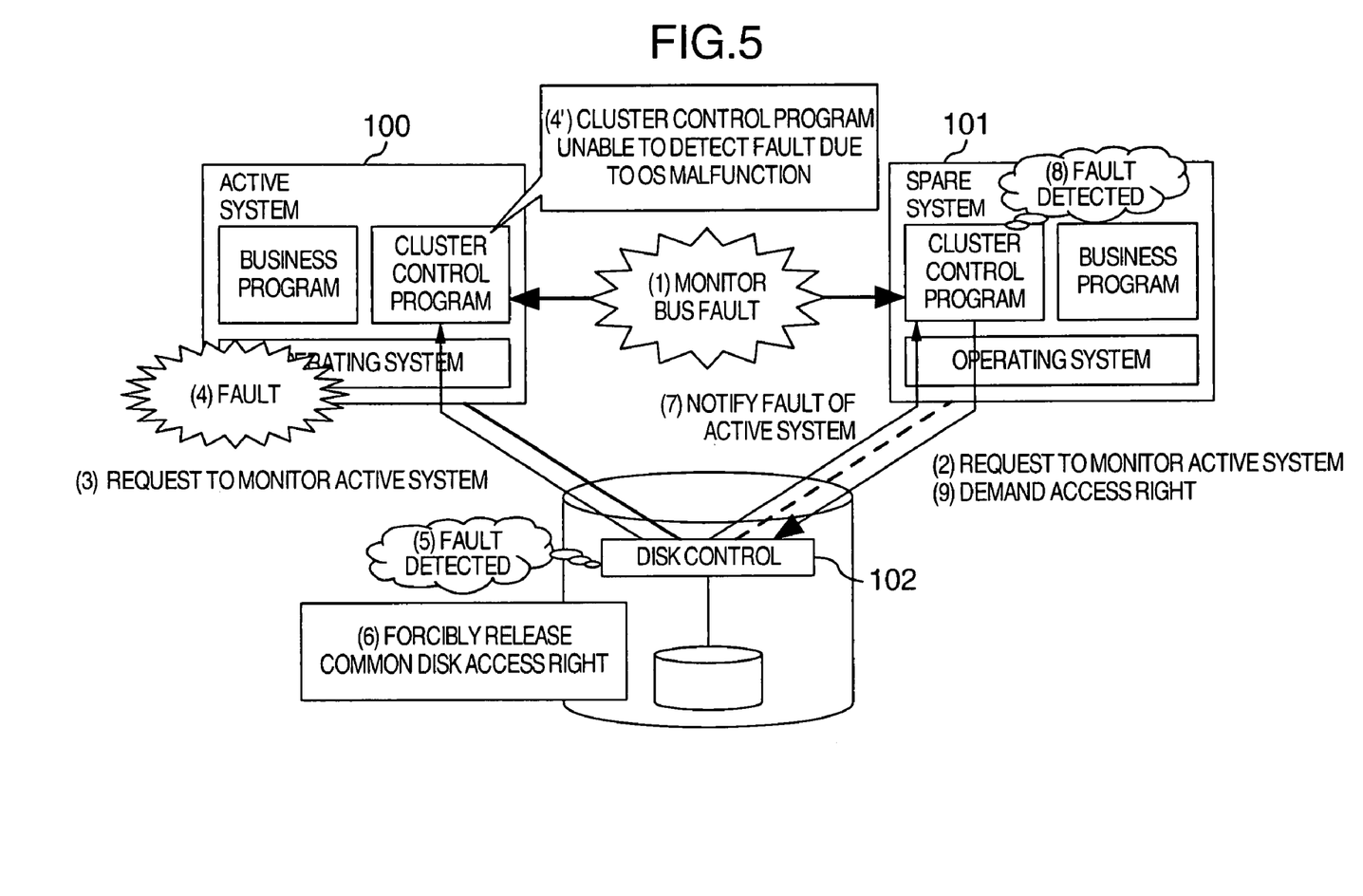
FIG. 5 is a diagram schematically showing the process in a computer managing system according to a second embodiment.

FIG. 5 is a diagram schematically showing the processing in the computer managing system according to this embodiment. As shown in FIG. 5, the computer managing system according to this embodiment operates as follows: Specifically, in the case where the heart beat stops due to the disconnection of a monitor bus, the spare system that has detected the cessation of the heart beat requests the disk to monitor the active system. The disk that has received the request from the spare system begins to monitor the active system, and the heart beat using the disk is started. After that, in the case where a malfunction of the operating system occurs in the active system and a system fault cannot be detected by the cluster control program, the heart beat ceases and the common disk detects the fault of the active system. Upon detection of the fault of the active system, the common disk forcibly causes the right to access the common disk to be released. The common disk notifies the spare system of the fault of the active system, and the cluster control program of the spare system detects the fault. The spare system demands the right to access the disk to newly function as an active system.

Figure 6:
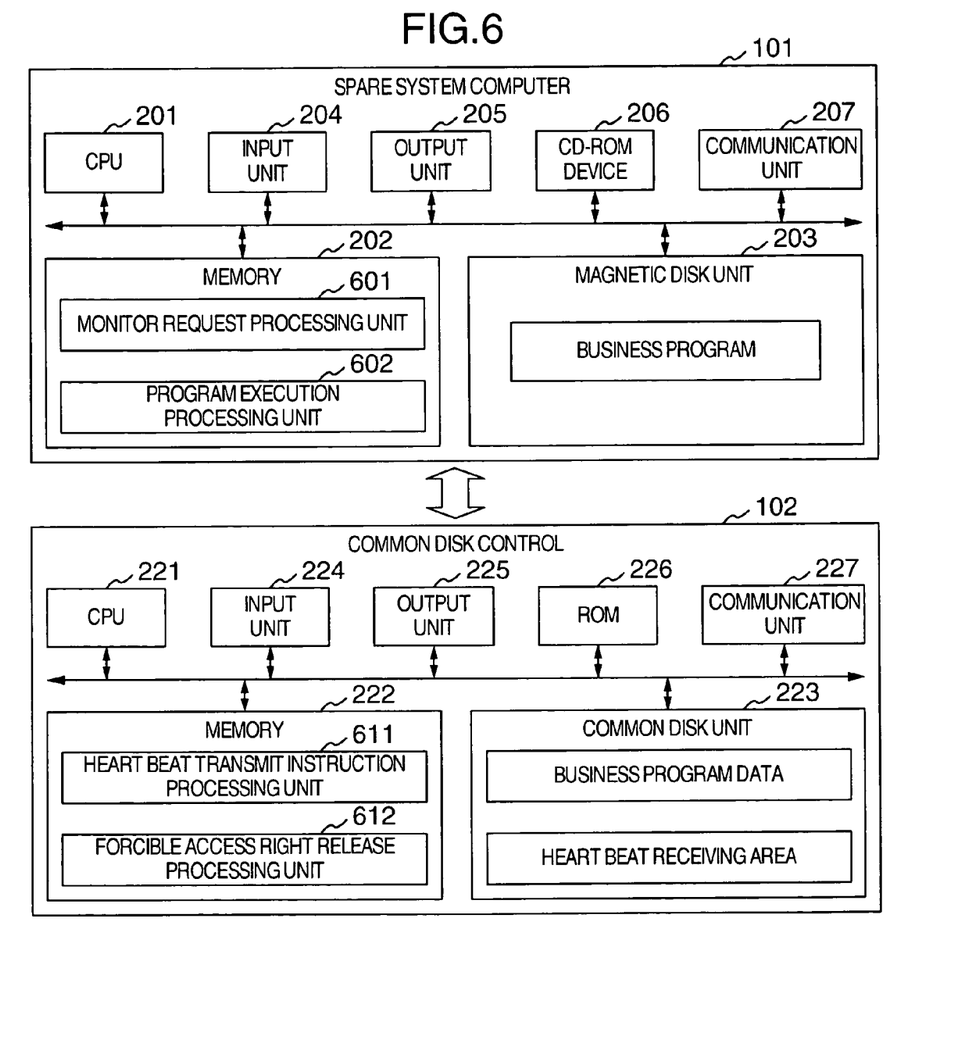
FIG. 6 is a diagram showing a general configuration of the spare system computer 101 and the common disk control unit 102 according to the second embodiment.

FIG. 6 is a diagram showing a general configuration of the spare system computer 101 and the common disk control unit 102 according to this embodiment. As shown in FIG. 6, the spare system computer 101 according to this embodiment includes a monitor request processing unit 601 and a program execution processing unit 602.

The monitor request processing unit 601, upon detection that the heart beat signal indicating that the active system computer 100 is normally operating has ceased, transmits a request to the common disk control unit 102 to monitor the active system computer 100.

The program execution processing unit 602 is a device for taking over the program processing operation thus far executed by the active system computer 100, in the case where the access right is granted to the spare system computer 101 by the common disk control unit 102.

The program for causing the spare system computer 101 to function as the monitor request processing unit 601 and the program execution processing unit 602 is recorded in a recording medium such as a CD-ROM, stored in a magnetic disk or the like, loaded in a memory and executed. The recording medium for recording the program may be other than the CD-ROM. Also, the program may be used by being installed in an information processing system from the recording medium or by accessing the recording medium through a network.

The common disk control unit 102 includes a heart beat transmission instruction processing unit 611 and a forcible release processing unit 612.

The heart beat transmission instruction processing unit 611, upon receipt of a monitor request from the spare system computer 101, instructs the active system computer 100 to transmit the heart beat signal to the common disk control unit 102.

The forcible release processing unit 612, upon detection of the cessation of the heart beat signal, causes the active system computer 100 to release the right to access the common disk and grants the access right to the spare system computer 101.

The program for causing the common disk control unit 102 to function as the heart beat transmission instruction processing unit 611 and the forcible release processing unit 612 is recorded in a recording medium such as a CD-ROM, stored in a magnetic disk or the like, loaded in a memory and executed. The recording medium for recording the program may be other than the CD-ROM. Also, the program may be used by being installed in an information processing system from the recording medium or by accessing the recording medium through a network.

Figure 7:
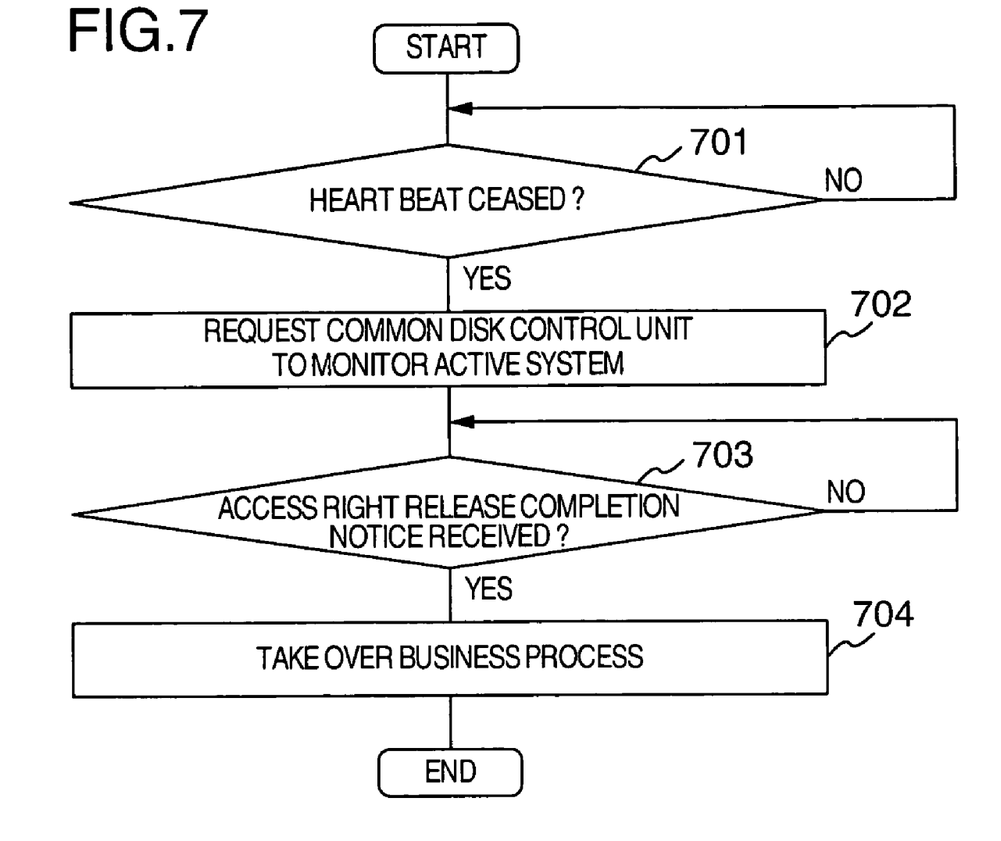
FIG. 7 is a flowchart showing the processing steps of the spare system computer 101 according to the second embodiment.

FIG. 7 is a flowchart showing the processing steps of the spare system computer 101 according to this embodiment. As shown in FIG. 7, in step 701, the monitor request processing unit 601 of the spare system computer 101 checks to see whether the heart beat signal is received or not from the active system computer 100 through the communication unit 207, and upon detection of the cessation of the heart beat signal, i.e. a fault in the active system computer 100, the process proceeds to step 702.

In step 702, a request to monitor the active system computer 100 is transmitted to the common disk control unit 102 through the communication unit 207.

Figure 8:
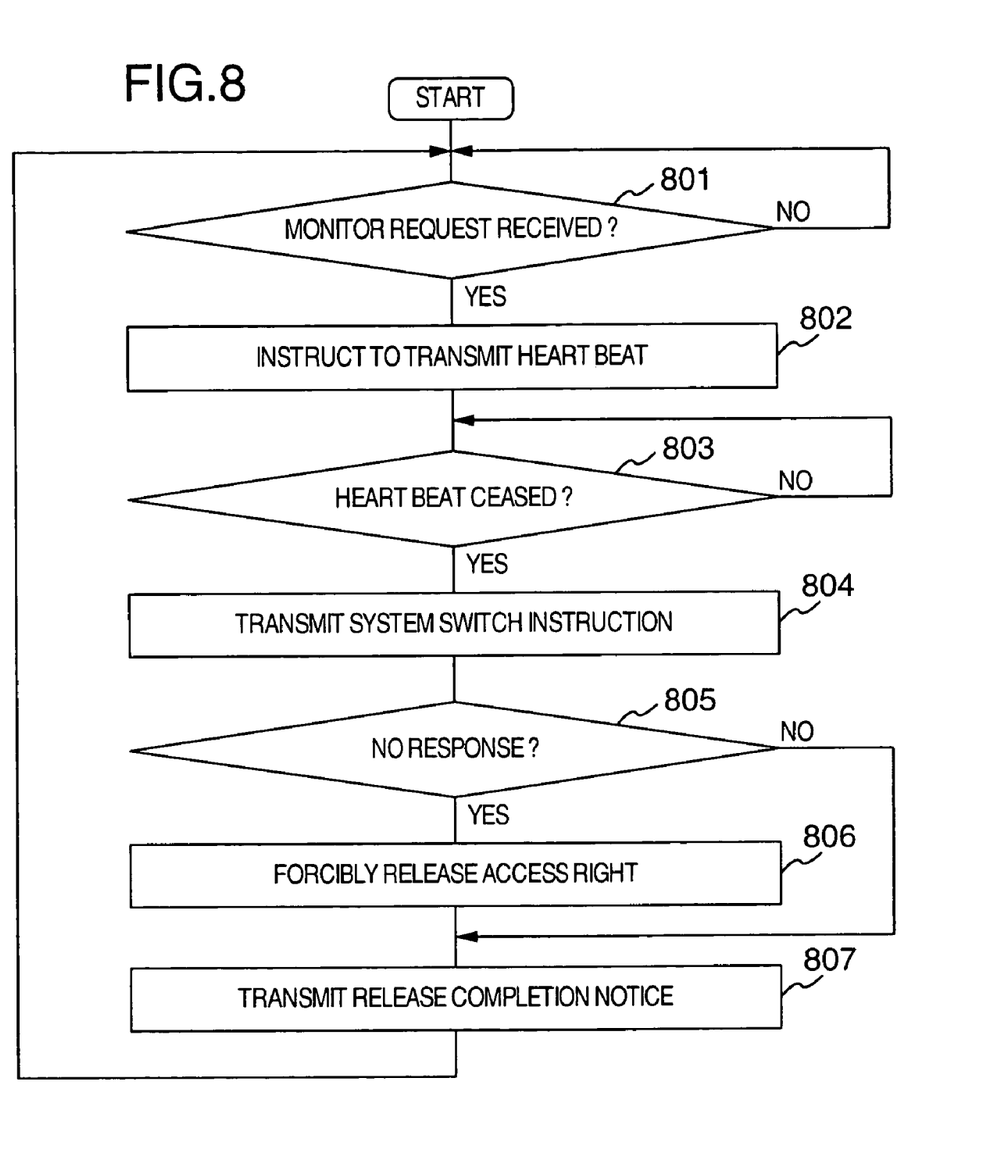
FIG. 8 is a flowchart showing the processing steps of the common disk control unit 102 according to the second embodiment.

FIG. 8 is a flowchart showing the processing steps of the common disk control unit 102 according to this embodiment. As shown in FIG. 8, in step 801, the heart beat transmission instruction processing unit 611 of the common disk control unit 102 checks to see whether the request to monitor the active system computer 100 is received or not from the spare system computer 101 through the communication unit 227, and in the case where the monitor request is so received, the process proceeds to step 802.

In step 802, the active system computer 100 is instructed, through the communication unit 227, to transmit to the common disk control unit 102 the heart beat signal indicating that the active system computer 100 is operating normally.

The active system computer 100 according to this embodiment has the function of transmitting the heart beat signal indicating that the active system computer 100 is normally operating, to the spare system computer 101 or the common disk control unit 102, and upon receipt of the instruction to transmit the heart beat signal to the common disk control unit 102, the destination of the heart beat signal is changed so that the heart beat signal is transmitted to the common disk control unit 102.

The heart beat operation using the common disk control unit 102 according to this embodiment is not performed by reading or writing specific data on the common disk excluding the active system and the spare system. Instead, the common disk receiving the heart beat signal from the active system detects a fault. Therefore, the problem is not posed that the I/O time is consumed by the excluding control operation for writing into/from the disk.

Step 803 is to check to see whether the heart beat signal is received from the active system computer 100 through the communication unit 227, and upon detection of the cessation of the heart beat signal, i.e. a fault in the active system computer 100, the process proceeds to step 804.

In step 804, an instruction to switch from the active system computer 100 to the spare system computer 101 is transmitted to the active system computer 100 through the communication unit 227. Step 805 is to check to see whether a response indicating that the system switch instruction is completely processed is received or not from the active system computer 100, and in the absence of a response of completion, the process proceeds to step 806.

In step 806, the forcible transfer processing unit 612 causes the active system computer 100 to release the right to access the common disk and grants the access right to the spare system computer 101 by changing the access control information stored in the common disk control unit 102.

In step 807, the right of the active system computer 100 to access the common disk is released and the notice that the spare system computer 101 is granted the access right is transmitted through the communication unit 227 to the spare system computer 101.

In step 703 shown in FIG. 7, the monitor request processing unit 601 of the spare system computer 101 checks to see whether the notice indicating that the access right is granted to the spare system computer 101 is received or not from the common disk control unit 102 through the communication unit 207, and in the case where such notice is received, the process proceeds to step 704.

In step 704, the program execution processing unit 602 detects from the particular notice that the right to access the common disk is granted to the spare system computer 101 as monitored by the common disk control unit 102, and the process is executed to take over the program process thus far executed by the active system computer 100.

With the computer managing system according to this embodiment, as described above, in the case of cessation of the heart beat signal from the active system computer to the spare system computer, the heart beat signal is transmitted from the active system computer to the common storage control unit. Even in the case where a fault occurs in the monitor bus for transmitting the heart beat signal from the active system computer to the spare system computer, therefore, the active system computer can continue to be monitored.

Third Embodiment

An explanation is given below about a computer managing system according to a third embodiment in which the heart beat signal is transmitted from the active system computer to the network control unit in the case of cessation of the heart beat signal from the active system computer to the spare system computer.

Figure 9:
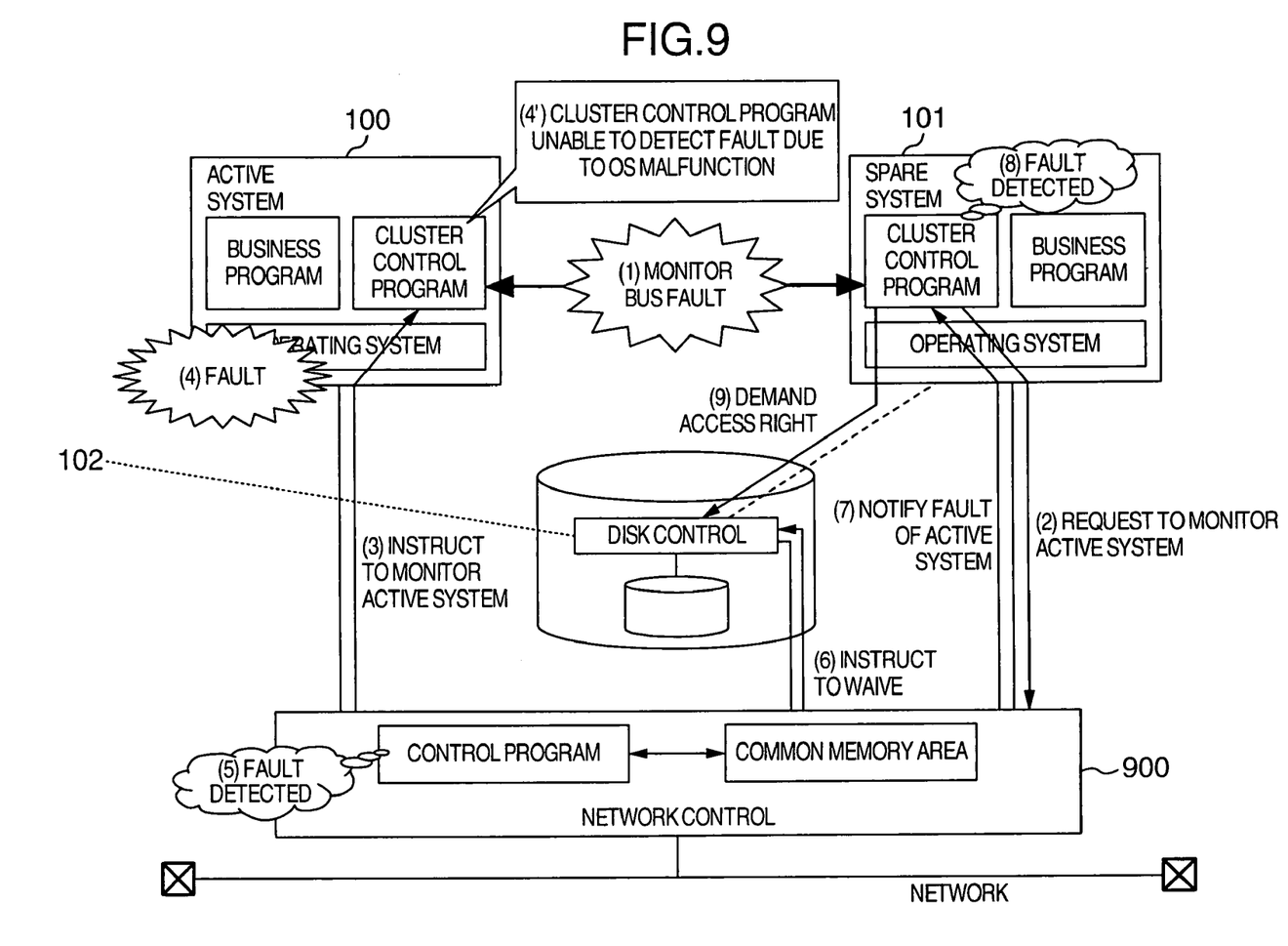
FIG. 9 is a diagram schematically showing the process in a computer managing system according to a third embodiment.

FIG. 9 is a diagram schematically showing the processing in a computer managing system according to this embodiment. As shown in FIG. 9, the computer managing system according to this embodiment operates in the following manner. Specifically, upon the cessation of the heart beat due to the disconnection of the monitor bus, the spare system that has detected the cessation of the heart beat requests the network control unit 900 (which may alternatively be a network switch, a network router, a network bridge, a computer, an information processing system or a program or an object for executing the processing) to monitor the active system. The network device that has received the request from the spare system gives an instruction to monitor the active system, and the heart beat using the network device is started. After that, in the case where a malfunction of the operating system occurs in the active system and the fault detection by the cluster control program becomes impossible, the heart beat ceases and the network control unit 900 detects a fault of the active system. Upon detection of a fault in the active system, the network control unit 900 gives an instruction for forcible release of the access right to the common disk. The network control unit 900 notifies the spare system of the fault in the active system, and the cluster control program of the spare system detects the fault of the active system. Thus, the spare system demands the right to access the disk to function newly as an active system.

Figure 10:
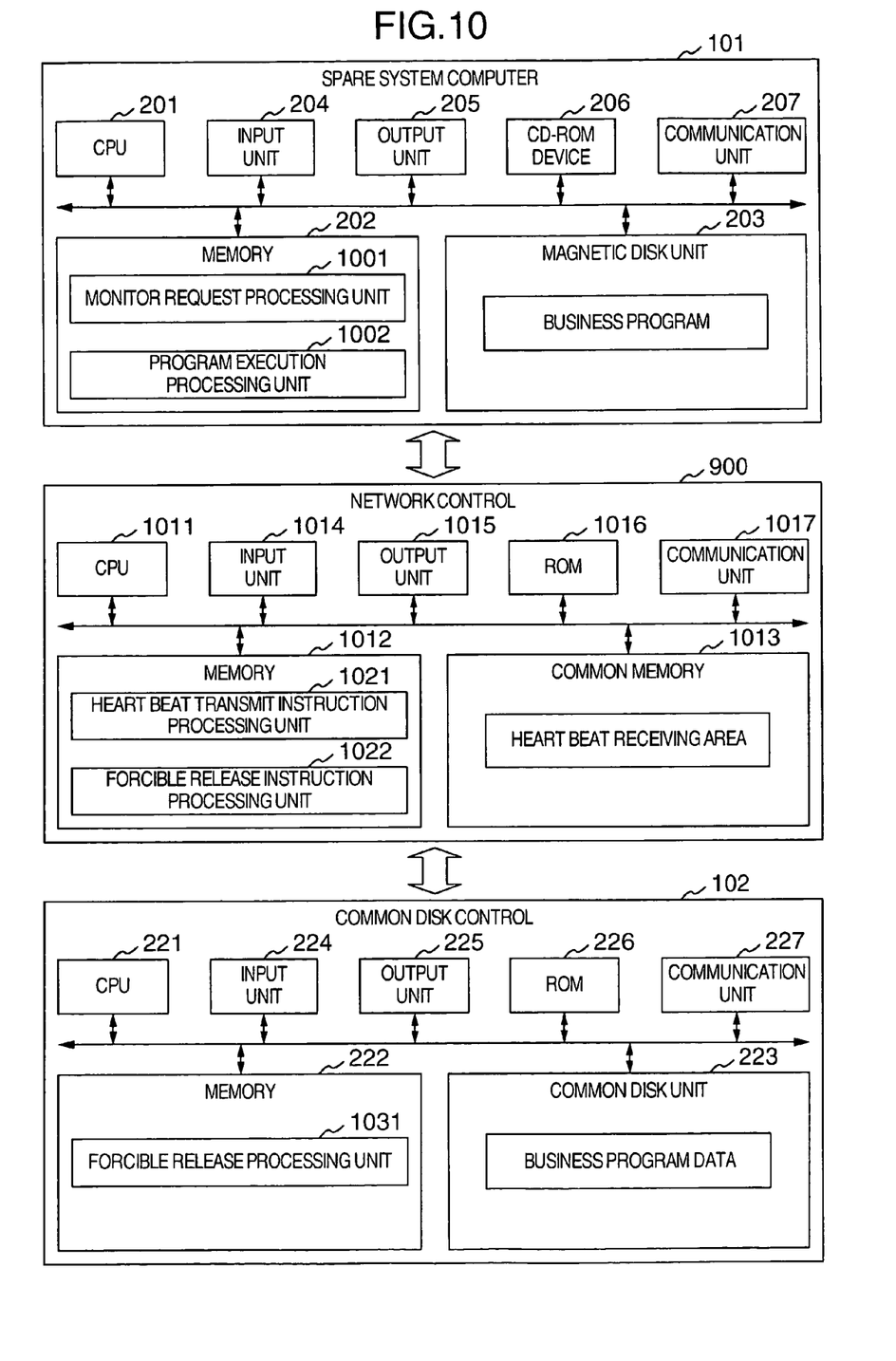
FIG. 10 is a diagram showing a general configuration of the spare system computer 101, the network control unit 900 and the common disk control unit 102 according to the third embodiment.

FIG. 10 is a diagram showing a general configuration of the spare system computer 101, the network control unit 900 and the common disk control unit 102 according to this embodiment. As shown in FIG. 10, the spare system computer 101 according to this embodiment includes a monitor request processing unit 1001 and a program execution processing unit 1002.

The monitor request processing unit 1001, upon detection of the cessation of the heart beat signal, transmits the request to monitor the active system computer 100 to the network control unit 900. The program execution processing unit 1002 takes over the program process thus far executed by the active system computer, in the case where the access right is granted to the spare system computer by the common disk control unit 102.

The program for causing the spare system computer 101 to function as the monitor request processing unit 1001 and the program execution processing unit 1002 is recorded in a recording medium such as a CD-ROM, stored in a magnetic disk or the like, loaded in a memory and executed. The program may alternatively be recorded in other than the CD-ROM. Also, the program may be used by being installed in an information processing system from the recording medium, or by accessing the recording medium through a network.

The network control unit 900 includes a CPU 1011, a memory 1012, a common memory 1013, an input unit 1014, an output unit 1015, a ROM 1016 and a communication unit 1017.

The CPU 1011 is a device for controlling the overall operation of the network control unit 900. The memory 1012 is a storage device for loading various processing programs and data to control the overall operation of the network control unit 900.

The common memory 1013 is a storage device for storing the heart beat signal transmitted from the active system computer 100. The input unit 1014 is a device for inputting various data to monitor the active system. The output unit 1015 is a device for outputting various data to monitor the active system.

The ROM 1016 is a nonvolatile storage unit having recorded thereon the various processing programs. The communication unit 1017 is a device for carrying out communication with other processing units through a network such as an internet or an intranet.

The network control unit 900 includes a heart beat transmit instruction processing unit 1021 and a forcible release instruction processing unit 1022.

The heart beat transmit instruction processing unit 1021, upon receipt of a monitor request from the spare system computer 101, instructs the active system computer 100 to transmit the heart beat signal to the network control unit 900.

The forcible release instruction processing unit 1022, upon detection of the cessation of the heart beat signal, instructs the common disk control unit 102 to cause the active system computer 100 to release the right to access the common disk.

The program for causing the network control unit 900 to function as the heart beat transmit instruction processing unit 1021 and the forcible release instruction processing unit 1022 is recorded in a recording medium such as a CD-ROM, stored in a magnetic disk or the like, loaded in a memory and executed. The program may be recorded in other than the CD-ROM. Also, the program may be used by being installed in an information processing system from the recording medium, or by accessing the recording medium through a network.

The common disk control unit 102 includes a forcible release processing unit 1031. The forcible release processing unit 1031, upon receipt of the forcible release instruction from the network control unit 900, causes the active system computer 100 to release the right to access the common disk, and grants the spare system computer 101 the access right.

The program for causing the common disk control unit 102 to function as the forcible release processing unit 1031 is recorded in a recording medium such as a CD-ROM, stored in a magnetic disk or the like, loaded in a memory and executed. The program may alternatively be recorded in other than the CD-ROM. Also, the program may be used by being installed in an information processing system from the recording medium, or by accessing the recording medium through a network.

Figure 11:
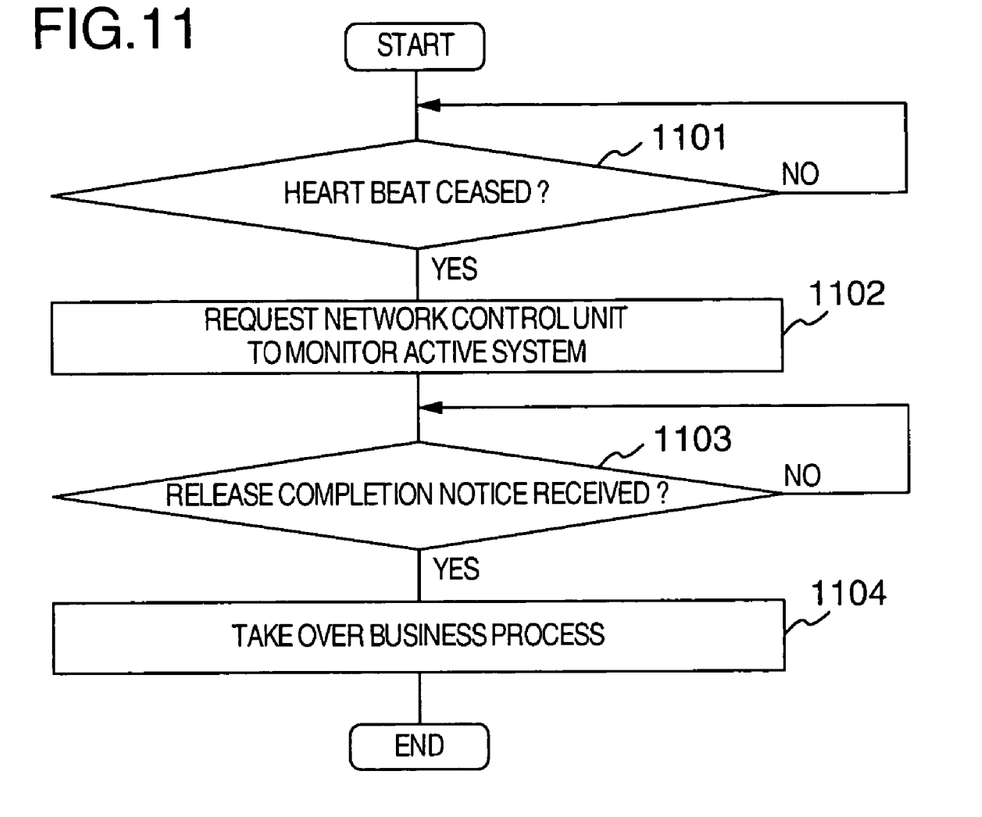
FIG. 11 is a flowchart showing the processing steps of the spare system computer 101 according to the third embodiment.

FIG. 11 is a flowchart showing the processing steps of the spare system computer 101 according to this embodiment. As shown in FIG. 11, in step 1101, the monitor request processing unit 1001 of the spare system computer 101 checks to see whether the heart beat signal is received from the active system computer 100 through the communication unit 207, and upon detection of the cessation of the heart beat signal, i.e. a fault in the active system computer 100, the process proceeds to step 1102.

In step 1102, a request to monitor the active system computer 100 is transmitted to the network control unit 900 through the communication unit 207.

Figure 12:
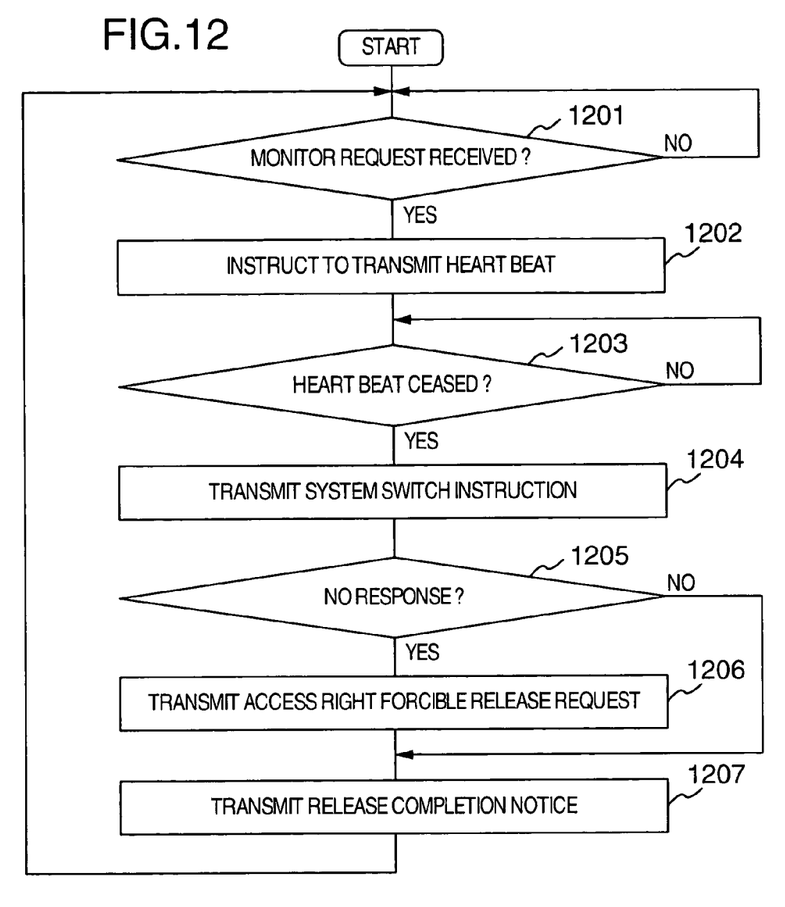
FIG. 12 is a flowchart showing the processing steps of the network control unit 900 according to the third embodiment.

FIG. 12 is a flowchart showing the processing steps of the network control unit 900 according to this embodiment. As shown in FIG. 12, in step 1201, the heart beat transmit instruction processing unit 1021 of the network control unit 900 checks to see whether the request to monitor the active system computer 100 is received from the spare system computer 101 through the communication unit 1017, and in the case where the monitor request is so received, the process proceeds to step 1202.

In step 1202, the active system computer 100 is instructed through the communication unit 17 to transmit to the network control unit 900 the heart beat signal indicating that the active system computer 100 is normally operating.

The active system computer 100 according to this embodiment has the function of transmitting the heart beat signal indicating that the active system computer 100 is in normal operation to the spare system computer 101 or the network control unit 900. Upon receipt of the instruction to transmit the heart beat signal to the network control unit 900, the destination of the heart beat signal is changed and the heart beat signal is transmitted to the network control unit 900.

The heart beat operation with the network control unit 900 according to this embodiment is not performed by reading/writing specific data in the common disk excluding the active system and the spare system. A fault is detected on the part of the network by receiving the heart beat signal from the active system on the common memory 1013 of the network control unit 900. Therefore, no problem is posed of consuming a considerable I/O time for excluding the active system and the spare system to read and write from and into the disk.

Step 1203 is to check whether or not the heart beat signal is received from the active system computer 100 through the communication unit 1017. Upon detection of the cessation of the heart beat signal, i.e. a fault in the active system computer 100, the process proceeds to step 1204.

In step 1204, an instruction to switch from the active system computer 100 to the spare system computer 101 is transmitted to the active system computer 100 through the communication unit 1017. Step 1205 is to check to see whether a response indicating that the processing in compliance with the system switch instruction has been complete is received from the active system computer 100 through the communication unit 1017, and in the absence of such a response, the process proceeds to step 1206.

In step 1206, the forcible transfer instruction unit 1022 instructs the common disk control unit 102 through the communication unit 1017 to cause the active system computer 100 to release the right to access the common disk.

Figure 13:
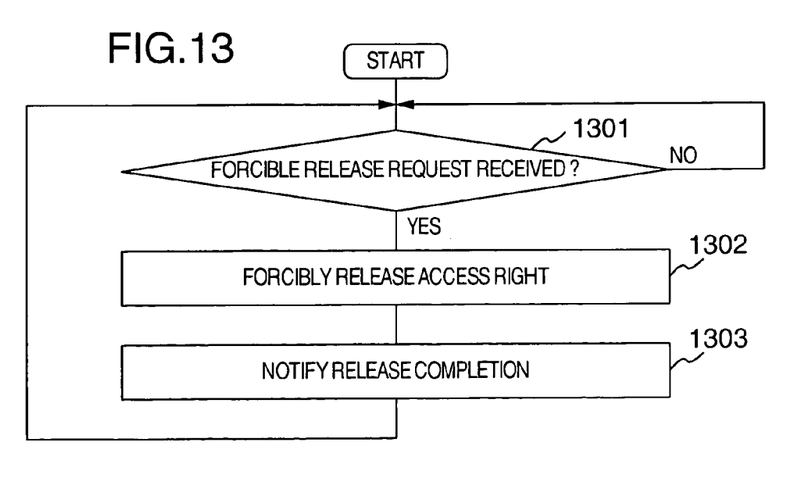
FIG. 13 is a flowchart showing the processing steps of the common disk control unit 102 according to the third embodiment.

FIG. 13 is a flowchart showing the processing steps of the common disk control unit 102 according to this embodiment. As shown in FIG. 13, in step 1301, the forcible release processing unit 1031 of the common disk control unit 102 checks to see whether an instruction to forcibly release the right of the active system computer 100 to access the common disk is received from the network control unit 900 through the communication unit 227, and in the case where the forcible release instruction is so received, the process proceeds to step 1302.

In step 1302, the active system computer 100 is caused to release the right to access the common disk and the spare system computer 101 is granted the access right by changing the access control information stored in the common disk control unit 102.

In step 1303, the notice to the effect that the right of the active system computer 100 to access the common disk is released and the spare system computer 101 is granted the access right is transmitted through the communication unit 227 to the network control unit 900.

In step 1207 of FIG. 12, the forcible release instruction processing unit 1022 of the network control unit 900 receives the notice from the network control unit 900 through the communication unit 1017, and a notice to the effect that the right of the active system computer 100 to access the common disk is released and the spare system computer 101 is granted the access right is transmitted through the communication unit 1017 to the spare system computer 101.

In step 1103 of FIG. 11, the monitor request processing unit 1001 of the spare system computer 101 checks to see whether the notice to the effect that the spare system computer 101 is granted the access right is received from the network control unit 900 through the communication unit 207, and in the case where the notice is so received, the process proceeds to step 1104.

In step 1104, the program execution processing unit 1002 detects, by the monitor operation of the network control unit 900, that the right to access the common disk is granted to the spare system computer 101, and executes the process for the spare system computer 101 to take over the program process thus far executed by the active system computer 100.

As described above, with the computer managing system according to this embodiment, in the case of cessation of the heart beat signal from the active system computer to the spare system computer, the heart beat signal is transmitted from the active system computer to the network control unit. Even in the case of a fault in the monitor bus for transmitting the heart beat signal from the active system computer to the spare system computer, therefore, the active system computer can be kept monitored.

According to this invention, the right to access the common device can be released and transferred even in the case where the switching from the active system computer is impossible.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A method of changing over in a multiplex system including a first computer and a second computer each having a processing unit for monitoring a fault of said first computer and said second computer by transmitting and receiving a heart beat signal to and from each other, and a disk control unit for controlling a disk enabled a setting of an access right to one of said first and second computers, comprising the steps of:
   determining whether or not a detection result of said heart beat signal transmitted from said first computer satisfies a predetermined condition by said second computer;
   transmitting a request for monitoring said first computer to said disk control unit in accordance with the determination result;
   transmitting a request for transmitting said heart beat signal to said first computer by said disk control unit, when receiving said monitoring request;
   determining whether or not a detection result of said heart beat signal transmitted from said first computer satisfies a predetermined condition by said disk control unit; and
   when satisfying the predetermined condition, releasing an access right to said disk of said first computer by said disk control unit.

2. A method according to claim 1, further comprising a step of:
   determining whether or not a fault occurrence in said first computer is notified to said second computer in accordance with the determination result indicating whether or not the detection result of said heart beat signal transmitted from said first computer satisfies the predetermined condition by said disk control unit.

3. A computer managing system comprising:
   an active system computer including a heart beat transmission processing unit for transmitting a heart beat signal indicating that an active system computer is being operated in normal to a spare system computer, and transmitting said heart beat signal to a first control unit when receiving a transmission instruction of said heart beat signal from said first control unit;
   a spare system computer including a monitor request processing unit for transmitting a monitoring request of said active system computer to said first control unit in accordance with a determination result of whether or not a fault has occurred in said active system computer; and
   said first control unit including a heart beat transmit instruction processing unit for instructing a transmission of said heart beat signal from said first control unit, to said active system computer, when receiving said monitoring request from said spare system computer, and wherein said first control unit determines whether or not a detection result of said heart beat signal transmitted from said active system computer satisfies a predetermined condition, and when satisfying the predetermined condition, releases an access right to a disk of said active system computer;

wherein said determination result of whether or not the fault has occurred in said active system computer, is a detection result in said monitor request processing unit for said heart beat signal transmitted from said active system computer, wherein the disk comprises:

a common disk enabled a setting of the access right to one of said active system computer and said spare system computer; and wherein the computer managing system further comprising:

a common disk control unit including a release processing unit for releasing said access right in accordance with a release instruction of said access right of said active system computer to said common disk, wherein said first control unit includes a release instruction processing unit for instructing the release of access right to said common disk of said active system computer, to said release processing unit, when the detection result of said heart beat signal from said active system computer satisfies the predetermined condition.

4. A computer managing system according to claim 3, wherein said release instruction processing unit notifies said spare system computer of the fault in said active system computer, when the detection result of said heart beat signal from said active system computer satisfies the predetermined condition.

5. A computer managing system according to claim 4, wherein said first control unit carries out communication with said active system computer and said spare system computer using a communication unit different from the communication unit of said common disk control unit.

6. A computer managing system according to claim 3, wherein said first control unit carries out communication with said active system computer and said spare system computer using a communication unit different from the communication unit of said common disk control unit.

7. A computer readable program recording medium including a program contained therein, said program when executed on a computing device performing:

transmitting, to a spare system computer, a heart beat signal indicating that an active system computer is being operated in normal, to function said active system computer as a heart beat transmission processing unit for transmitting the heart beat signal to a first control unit, when receiving a transmission instruction of the heart beat signal from said first control unit;

functioning a spare system computer as a monitoring request processing unit for transmitting, to said first control unit, a monitoring request of said active system computer in accordance with a determination result of whether or not a fault is occurred in said active system computer;

functioning said first control unit as a heart beat transmit instruction processing unit for instructing a transmission of said heart beat signal from said first control unit, to said active system computer, when receiving the monitoring request from said spare system computer, and determining whether or not a detection result of said heart beat signal transmitted from said active system computer satisfies a predetermined condition, and when satisfying the predetermined condition, releasing an access right to a disk of said active system computer, wherein the determination result of whether or not the fault has occurred in said active system computer, is a detection result of the heart beat signal transmitted from said active system computer by said monitor request processing unit, wherein the disk comprises a common disk, a common disk control unit having the common disk enabled a setting of the access right to one of said active system computer and said spare system computer, is functioned as a release processing unit for releasing said access right in accordance with a release instruction of said access right of said active system computer to said common disk, and wherein said first control unit is functioned as a release instruction processing unit for instructing the release of said access right to said common disk of said active system computer, to said release processing unit, when the detection result of said heart beat signal from said active system computer satisfies the predetermined condition.

8. A computer readable program recording medium according to claim 9, wherein said first control unit is functioned as said release instruction processing unit for notifying said spare system computer of the fault in said active system computer, when detection result of said heart beat signal from said active system computer satisfies the predetermined condition.

9. A computer readable program recording medium according to claim 8, wherein said first control unit carries out communication with said active system computer and said spare system computer using a communication unit different from the communication unit of said common disk control unit.

10. A computer readable program recording medium according to claim 9, wherein said first control unit carries out communication with said active system computer and said spare system computer using a communication unit different from the communication unit of said common disk control unit.

* * * * *